United States Patent Office 3,432,513
Patented Mar. 11, 1969

3,432,513
OLEFIN POLYMERIZATION PROCESS FOR PRODUCING HIGHLY ISOTACTIC POLYMERS
Donald B. Miller, Gifford G. McClaflin, Wayne R. Sorenson, and Homer L. Hackett, Ponca City, Okla., assignors to Continental Oil Company, Ponca City, Okla., a corporation of Delaware
No Drawing. Filed Feb. 12, 1964, Ser. No. 344,193
U.S. Cl. 260—93.7
Int. Cl. C08f 1/56
3 Claims

ABSTRACT OF THE DISCLOSURE

A polymerization process for producing highly isotactic polymers from ethylenically unsaturated monomers containing three or more carbon atoms which comprises contacting said monomers with the following compounds added sequentially (1) halogen containing compound having the following structural formula

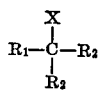

where X is a halogen atom, $R_1$ is aryl, alkyl, aralkyl, alkaryl, hydrogen or halogen, and $R_2$ is aryl, alkyl, aralkyl, alkaryl, hydrogen or halogen;
(2) an organo-aluminum compound; and
(3) at titanium metal halide.

---

This invention relates to a process for polymerizing certain olefinic materials, and to certain new catalyst compositions employed in such polymerization process. More particularly, but not by way of limitation, the present invention relates to the polymerization of ethylenically unsaturated monomers to produce stereo regulated polymers, that is, polymers having a high isotactic content. In one of its aspects, the invention relates to an improved method of polymerizing propene. In another of its aspects, the invention relates to a novel method of lowering the molecular weight of polymers produced by the polymerization of ethylenically unsaturated monomers, and to the provision of a suitable reaction medium for such polymerization.

Polymerization processes by which ethylenically unsaturated monomers, such as ethylene, propene and styrene, are polymerized to form valuable polymers, such as polyethylene, polypropylene and polystyrene, are now well known and widely used. One of the most important considerations in any polymerization process which is catalytically promoted is the cost, properties and effectiveness of the catalyst which is used. In the polymerization of ethylenically unsaturated monomers, and particularly, of propene, coordination-type catalysts of the general type commonly referred to as Ziegler-Natta catalysts, are widely used.

In its most basic form, the Ziegler-Natta catalyst system includes an organo-metallic compound (the metal being selected from Groups I to III of the Periodic Table and preferably being aluminum) and a transition metal halide (frequently one of the titanium halides). Many modifications and improvements have been made with respect to the basic constitution of the Ziegler-Natta catalyst systems, and many of these improved catalyst compositions have been effective in the attainment of the specific ends for which they were developed. Thus, some of the Ziegler-Natta catalyst systems in use art effective to give a relatively high yield of polymer and/or are also effective to vary the molecular weight of the polymer produced. Examples of catalyst systems of the Ziegler-Natta type which include certain modifying compounds functioning to lower the molecular weight of the polymer produced are those described in U.S. Patent 2,971,950, which discloses the use of alkyl halides and hydrogen halides as molecular weight modifying constituents of the Ziegler-Natta system, British Patent 790,399 (using haloalkanes as molecular weight modifying constituents of the system) and U.S. Patent 3,029,231, which discloses the use of certain specific types of vinyl halide compounds for the purpose of modifying the molecular weight of the polymer produced. Other patents which disclose the effectiveness of various types of organic and inorganic halide compounds in assisting in molecular weight control when added to the basic two-component Ziegler-Natta catalyst system are Belgian Patent 585,435, British Patent 887,974 and U.S. Patent 2,912,425.

In tht case of the polymerization of some ethylenically unsaturated monomers, and particularly in the case of the polymerization of propylene, the presently existing commercial usage of the polymer in many instances requires that the polymer be characterized by a high degree of crystallinity or isotaxy This latter property (isotaxy) of the polymer results from the stereo regularity of the repeating units of the copolymer chain and is manifested by a more highly crystalline or less amorphous character in the polymer. When the basic, two-component Ziegler-Natta catalyst is utilized for polymerizing propylene, the degree of isotaxy which characterizes the polypropylene product as measured by the accepted criterion of solubility in boiling heptane, does not generally exceed about 65 percent. This low degree of isotaxy renders the polypropylene so produced unsuitable for the majority of present commercial requirements so that production of polypropylene employing the basic, two-component catalyst system has been necessarily limited. Other attempts to improve the isotaxy of polypropylene by incorporating various modifiers in the basic Ziegler-Natta catalyst system have resulted in some improvement in the isotaxy of the polymer produced, but have frequently resulted in a reduction in the rate of polymerization or the yield which is so severe as to render the employment of such catalyst systems of questionable feasibility.

It is an important object of the present invention to provide an improved process for polymerizing ethylenically unsaturated monomers, and to provide improved catalyst systems for use in such process.

Another object of this invention is to provide improved polymerization catalyst systems which are capable of forming polymers having very high isotactic content, and which, in some instances, may be simultaneously employed to control or lower the molecular weight of the polymer product and improve its isotactic content.

A further object of the present invention is to provide an improved polymerization catalyst which may, in itself, constitute the polymerization reaction medium, and which may simultaneously effectively catalyze the polymerization reaction to yield polymers having a relatively high isotactic content and a lowered molecular weight.

An additional object of the present invention is to provide improved catalyst systems which are highly effective and relatively inexpensive when utilized in the process of the invention for polymerizing certain olefinic materials.

A more specific object of the invention in one of its forms of practice is to provide an improved process for polymerizing propene.

Yet another object of the present invention is to provide a catalyst which may be employed in the process of polymerizing propene so as to yield polypropylene having a higher degree of isotaxy than has previously been obtainable utilizing many of the catalysts heretofore proposed for the polymerization of propene.

Another object of the present invention is to provide a novel reaction medium in which the polymerization of ethylenically unsaturated monomers may be carried out, which reaction medium also forms a part of the effective polymerization catalyst system used, and functions in such system to increase the degree of isotaxy resulting in polymers which are produced in such reaction medium using such catalyst system.

An additional object of the present invention is to provide a novel polymerization catalyst system which may be employed for catalyzing the polymerization of ethylenically unsaturated monomers to yield polymers of reduced molecular weight and improved crystallinity.

In addition to the foregoing described objects of the invention, additional objects and advantageous features of the invention will become apparent from the following detailed description of the invention.

Broadly, the catalyst composition which is employed in the process of the present invention comprises a titanium halide compound, an organo-aluminum compound and an organic halide compound selected from the group consisting of:

(a) Vinyl halides, (b) Compounds having halogen on a carbon atom located alpha to a site of carbon-carbon unsaturation and including the atomic arrangements represented by the structural formulae

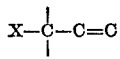

and

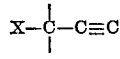

wherein X represents halogen, and provided that the carbon atom to which X is bonded is included in a radical selected from the group consisting of aliphatic and cycloaliphatic radicals; in other words, the compounds included in group (b) may be acyclic or alicyclic, and (c) Compounds represented by the general formula

where X represents halogen, $R_1$ is selected from the group consisting of hydrogen, halogen and hydrocarbon radicals, and $R_2$ is selected from the group consisting of halogen and hydrocarbon radicals, provided that (1) when $R_1$ is halogen, $R_2$ may be hydrogen;
(2) when C is a secondary carbon atom, $R_1$ and $R_2$ include a halide substituted hydrocarbon radical; and
(3) when C is substituted with three fluorine atoms, the remaining substituent is selected from the group consisting of chlorine, bromine and iodine.

The compounds included in group (c) above may be either cyclic or acyclic.

In one aspect, the invention is directed to the novel catalyst compositions comprised of the three materials described, and to the method of preparing such compositions. In another aspect, the invention relates to the use of these catalyst systems in the polymerization of ethylenically unsaturated monomers. The several components of certain specific ones of the catalyst systems useful in the present invention have been heretofore utilized in the polymerization of ethylenically unsaturated monomers. However, the processes involved in such use were directed toward the production of polymers having particular properties other than those especially sought in the practice of the methods of the present invention and, in many instances, the mole ratio of the several catalyst components to each other and/or the process conditions employed to achieve the desired end varied materially from the mole ratios, and also from the conditions employed in practicing the processes of the present invention. In the case of other specific catalyst compositions formulated in accordance with the teaching of the present invention, such compositions are believed to be novel per se without reference to the particular mole ratio or atomic ratios of the several components which are used—in other words, qualitatively new.

The organo-aluminum compounds which are useful in the invention are represented by the formula $AlR_nX_{3-n}$ where R is a hydrocarbon radical, X is selected from hydrogen and halogen selected from the group consisting of chlorine, bromine and iodine, and $n$ varies from 2 to 3. Of these materials, those in which the hydrocarbon substituents of the aluminum are alkyl groups are preferred. These preferred compounds within the scope of the structural formula above include, but are not limited to, triethyl aluminum, tripropyl aluminum, triisobutyl aluminum, triamyl aluminum, diethyl aluminum hydride, dipropyl aluminum hydride, isobutyl aluminum dichloride, diamyl aluminum hydride, diethyl aluminum bromide and propyl aluminum diiodide. Two of the most preferred compounds for use in the invention are triethyl aluminum and diethyl aluminum hydride.

In addition to the various preferred types of alkyl substituted aluminum compounds mentioned, it will be apparent that the formula set forth above can include other aluminum compounds, such as the aryl halides and hydrides, as well as aluminum compounds fully substituted with other hydrocarbon groups. The hydrocarbon radicals in the aluminum compounds can be either like or unlike, and can include the aromatic and saturated aliphatic radicals as, for example, alkyl, aryl, cycloalkyl, alkaryl and aralkyl. The hydrocarbon groups, whether alkyl or other types, are preferably limited to those containing from 1 to about 12 carbon atoms, and are most preferably the lower alkyl groups containing from about 2 to about 8 carbon atoms. As will be hereinafter explained, a statistically distributed (referring to the number of carbon atoms contained therein) mixture of trialkyl aluminum compounds which contain varying numbers of carbon atoms, and produced by the random addition of ethylene to triethyl aluminum by a commercial process now being practiced, may be successfully used as the organo-aluminum compound used in the invention.

The titanium metal halides which constitute the second component of the catalyst system of the present invention are identified by the formula $TiX_n$ wherein X is selected from chlorine, bromine and iodine, and $n$ varies from 1 to 4. The most desirable single titanium halide for use in the catalyst system of the invention is titanium trichloride; however, other titanium compounds defined by the formula set forth above can also be very effectively employed in the catalyst compositions. For example, titanium tetrachloride is particularly useful in the polymerization of ethylene.

The organic halide compounds which may be employed as the third, or "modifier," component of the catalyst systems of the present invention include the various types of organic halides hereinbefore broadly described. It has been surprisingly determined that these materials function in combination with the organo-aluminum compound and a titanium halide compound to substantially increase the isotaxy of the polymers prepared by the use thereof. Moreover, in the case of one of the novel catalyst systems of the invention, the modifier utilized (trichloroethylene) has been found to be useful in molecular weight control in some polymerizations, as well as useful for the purpose of increasing the isotaxy of certain polymers produced by the use thereof.

The organic halide compounds which constitute one component of the catalyst systems of the invention may be selected from three broad types of compounds, the first of which, as hereinbefore indicated, can be termed vinyl halides, and may be further characterzied as including the atomic grouping

where $X_1$ and $X_2$ are selected from the group consisting of hydrogen and halogen, and $X_3$ and $X_4$ are selected from the group consisting of hydrogen, halogen and hydrocarbon radicals, provided (a) that at least one of $X_1$, $X_2$, $X_3$ and $X_4$ is halogen; and (b) that the two carbon atoms are substituted with less than four fluorine atoms and less than four chlorine atoms.

Examples of vinyl halide compounds which are suitable for use in the catalyst systems of the invention include, but are not limited to, vinyl chloride, vinyl fluoride, 1,1-dichloroethylene, trans-1,2-dichloroethylene, cis-1,2-dichloroethylene, 2-chloropropene, 2-chloro-1,3-butadiene and trichloroethylene.

The second group of organic halogen compounds which may be employed in the invention are those which include either or both of the atomic groupings

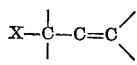

and

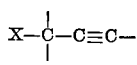

wherein X represents halogen, and provided that the halogen substituted carbon atom is excluded from an aromatic ring. The compounds in the second group which are characterized by the atomic grouping set forth above may be either acyclic or alicyclic. Examples of compounds which include at least one of these atomic groupings include, but are not limited to, chlorotriphenyl methane, chlorodiphenyl methane, benzyl chloride, benzal chloride, benzotrichloride, 1,4-bis(tri-chloromethyl)benzene, 1-bromo-1-phenyl ethane, 3-chloropropene and 3-chloropropyne.

The third group of organic halogen compounds which may be used as the modifier or third component in the catalyst systems of the invention are compounds which are represented by the general formula

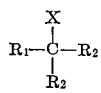

where X is halogen, $R_1$ is selected from the group consisting of hydrogen, halogen and hydrocarbon radicals, and $R_2$ is selected from the group consisting of halogen and hydrocarbon radicals, provided (a) that when $R_1$ is halogen, $R_2$ may be hydrogen, (b) that when C is a secondary carbon atom, $R_1$, $R_2$ include a halide substituted hydrocarbon radical, and (c) that when C is substituted with three fluorine atoms, the remaining substituent is selected from the group consisting of chlorine, bromine and iodine.

The compounds included in the third group identified above may be either cyclic or acyclic. Specific examples of compounds included within the definition set forth above are carbon tetrachloride, chloroform, bromoform, iodoform, 1,1,1-trichloroethane, hexachloroethane, 1,2,3,4,5,6-hexachlorocyclohexane, trifluoroiodomethane, 2,2-dichloropropane, 1,1-dichlorobutane, 1,1,2,2-tetrachloroethane, 2-chloro-2-methylpropane, 1,1,1,5-tetrachloropentane, carbon tetrabromide and methylene chloride.

We have determined that certain compounds which are structurally similar to compounds included within the broad definitions set forth above are, for reasons not completely understood, ineffective as modifiers in the catalyst systems of the present invention, particularly insofar as is concerned their effectiveness in increasing the isotaxy or stereo regularity of the polymers produced using such systems. Examples of these apparently inoperative related compounds include (1) the saturated primary monohalides, such as methyl chloride, methyl iodide, 1-chloropropane and 1-bromopropane, (a) aromatic halides, such as chlorobenzene and 1,2-dichlorobenzene, (3) trifluoromethyl derivatives, such as fluoroform and 1,3-bis(trifluoromethyl) benzene, and (4) tetrachloroethylene and tetrafluoroethylene. In general, these materials are excluded from the definitions or characterizations of the useful organic halogen compounds set forth by the stated provisos to the general structural formulae.

As the various functional groups and atomic arrangements represented by the atomic groupings or structural formulae set forth above are mainly responsible for the effect of the organic halogen modifiers in increasing isotaxy of the polymer product, the specific nature of the substituents, if any, which are attached to the several free carbon bonds shown in the above formulae or atomic groupings are not of great importance. Thus, where a particular radical or group attached to a carbon atom is indicated to be hydrocarbon in nature, this term is intended to comprehend and include both substituted and unsubstituted hydrocarbon radicals. Where no specific type of radical or group is indicated as being bonded to a particular carbon atom, the substituents of the carbon atom may be aryl, alkyl, aralkyl, alkaryl or substituted organic radicals including these groups. In some instances, a useful organic halide compound may include more than one of the above identified atomic groupings and may thus, of course, include a plurality of halogen atoms disposed in the specified relation to certain carbon atoms.

A wide variety of combinations of the several components of the catalyst systems of the present invention are, of course, possible and space permits identification of only a relatively small portion of the total number of catalyst systems which can be employed. In some instances, the catalyst systems are qualitatively novel by virtue of the presence of the particular components included therein, while in other instances, the systems are believed to contain the three identified components in mole or atomic ratios which have not heretofore been employed. These constituent proportions permit such systems to be used to effectively increase the isotaxy of the polymer products produced through the use of the catalysts, as well as permitting certain other properties of the polymer product to be varied and controlled as desired. All of the catalyst systems, when the proper mole or atomic ratio of the three components are used, can be used to substantially improve the isotactic content of polymers produced thereby, and the discovery of this property is one of the most surprising and important aspects of the invention. A more detailed discussion of the significance of the quantity ratios of the several catalyst components to each other, and the effect of varying such ratios on the polymerization results obtained will be deferred to a subsequent point in the detailed description of the invention.

The following examples are presented merely as specific exemplifications of the qualitative nature of catalyst systems which are effective in practicing the methods of the invention, and are by no means intended to constitute an all-inclusive statement of the operative catalyst systems meeting the broad definition hereinbefore set forth. Triethyl aluminum, titanium trichloride and vinyl chloride; diethyl aluminum hydride, titanium dichloride and chlorotriphenyl methane; dipropyl aluminum chloride, titanium tetrachloride and carbon tetrachloride; triisobutyl aluminum, titanium tribromide and vinyl fluoride; diphenyl aluminum hydride, titanium triiodide and chlorodiphenyl methane; triisopropyl aluminum, titanium trichloride, and chloroform; dihexyl aluminum hydride, titanium tetrachloride and 1,1,-dichloroethylene; triethyl aluminum, titanium tribromide and benzyl chloride; diethyl aluminum hydride, titanium tribromide and bromoform; dipropyl aluminum chloride, titanium tetrabromide and trans-1,2-dichloroethylene; dinonyl aluminum iodide, titanium trichloride and benzal chloride; didodecyl aluminum bromide, titanium tribromide and iodoform; tridecyl aluminum, titanium tetrachloride and cis-1,2-dichloroethylene; tricyclohexyl aluminum, titanium dibromide and benzotrichloride; tribenzyl aluminum, titanium tetraiodide and 1,1,1,-trichloroethane; trimethylcyclopentyl aluminum, titanium diiodide and 2-chloropropene; trieicosyl aluminum, titanium trichloride and 1,4-bis(trichloromethyl)benzene; dicyclobutyl aluminum hydride, titanium tribromide and hexachloroethane; triphenyl aluminum, titanium triiodide and 2-chloro-1,3-butadiene; trioctadecyl aluminum, titanium tetrachloride and 1-bromo-1-phenyl ethane; tricyclobutyl aluminum, titanium tetrabromide and 1,2,3,4,5,6-hexachlorocyclohexane; diisobutyl aluminum hydride, titanium dichloride and trichloroethylene; diphenyl aluminum chloride, titanium dichloride and 3-chloropropene; triethyl aluminum, titanium tetraiodide and trifluoroiodomethane; triisopropyl aluminum, titanium dibromide and 3-chloropropyne; didodecyl aluminum bromide, titanium trichloride and 2,2-dichloropropane; triphenyl aluminum, titanium tribromide and 1,1-dichlorobutane; dipropyl aluminum chloride, titanium trichloride and 1,1,2,2-tetrachloroethane; diethyl aluminum hydride, titanium diiodide and 2-chloro-2-methylpropane; triethyl aluminum, titanium trichloride and 1,1,1,5-tetrachloropentane; diethyl aluminum hydride, titanium dichloride and carbon tetrabromide; dipropyl aluminum chloride, titanium tetrachloride and methylene chloride.

The preferred catalyst systems for use in practicing the process of the invention, and particularly, for use in improving the stereo regularity of propylene, styrene and other monomers susceptible to stereo regulation, are those which include the organic halide compounds hereinbefore described when such compounds are used in combination with titanium trichloride and either triethyl aluminum or dialkyl aluminum hydride. The amount of the organic halide compound which is employed in the three-component catalyst system may conveniently be related to the amount of the other catalyst components, and particularly, to the amount of the organo-aluminum compound employed.

The amount of the organic halide compound used in the catalyst system will vary considerably, depending upon the particular organic halide compound utilized, the particular components of the basic Ziegler-Natta catalyst which are used in combination with the organic halide, the polymerization reaction conditions employed, and the extent to which modification of the polymer product from that obtained with the basic catalyst is desired. Certain of the catalyst systems comprehended by the invention, although hereofore qualitatively known to the prior art as polymerization catalysts, have been utilized solely for purposes other than increasing the isotaxy or stereo regularity of polymers produced through the use thereof. We have surprisingly determined that the heretofore known catalysts which are included within the broader qualitative definition of catalysts suitable for the present invention, while useful (when the components of the system are combined in certain heretofore known mole ratios) for purposes such as lowering or controlling the molecular weight of the polymer produced thereby, must be made up with the components in quite a different proportion in order to function effectively in improving the isotaxy of the polymer products.

In general, the amount of the organic halide compound which is used in the catalyst systems of this invention will be chosen so that a marked or discernible improvement in the stereo-selectivity of the basic catalyst ingredients is realized, while avoiding an undesirable decrease in the activity of the catalyst system. Even though a particular catalyst system which is prepared in accordance with the teaching of the present invention may be inactive in some polymerization reactions, it should be realized that the particular system may still display an acceptable degree of activity, and effect a desirable improvement in the isotaxy of the polymer product in other polymerization reactions. Therefore, in its broader aspects, the present invention contemplates any basic Ziegler-Natta catalyst of the type hereinbefore described modified by the addition of a sufficient amount of the defined organic halide compounds to result in an improvement in the isotaxy of the polymer product over that which is obtained without the addition of such organic halide compound.

Although the particular mole ratio of the organic halide compound to organo-aluminum compound employed will be specific to a particular catalyst system and to a particular polymerization which is to be carried out, substantially all of the organic halides employed are effective somewhere in the halogen to aluminum atomic ratio range of from about 0.8 to about 100. However, many of the organic halides are effective to increase the isotaxy of the polymer product only when used in amounts falling within certain relatively narrow portions of this atomic ratio range. Thus, with single carbon alkyl di-, tri- and per halides, such as chloroform, carbon tetrachloride, iodoform, bromoform and carbon tetrabromide, the atomic ratio can range from about 0.8 to about 1.5. This corresponds to a mole ratio of from about 0.2 in the case of the single carbon alkyl groups having four halogen substituents, to about 0.75 in the case of the di-substituted single carbon alkyl groups. Other than the single carbon alkyl di-, tri- and per halides, substantially all of the remaining operative organic halides appear to be most effective in increasing the isotaxy of the polymer product when they are used in a halogen to aluminum atomic ratio in the range of from about 1 to about 100. In the case of certain alkyl and aralkyl monohalide compounds, such as α-bromoethylbenzene and tertiary butyl chloride, the mole (and atomic) ratio of the organic halide to aluminum compound which is effective is generally from about 1 to about 5, although dodecylbenzene chloride displays some effectiveness when used in an atomic ratio of slightly less than 1 (see Table VI appearing hereinafter). 1,1,2,2-tetrachloroethane has been observed to be very effective at a halogen to aluminum ratio of from about 4 to about 20. Trichloroethylene is effective at a halogen to aluminum ratio of about 50, and methylene chloride is effective at a halogen to aluminum atomic ratio of from about 20 to about 100. It has been surprisingly determined, as evidenced by the data hereinafter appearing, that in those instances where certain of the organic halides used as catalyst modifiers in the present invention have heretofore been used as catalyst modifiers for the purpose of decreasing the molecular weight of the polymer product, the same organic halides will function to increase the isotaxy of the polymer product when used in the catalyst in amounts previously considered too great for the purpose of increasing the molecular weight.

The reason is uncertain why some organic halides are effective at halogen to aluminum atomic ratios of near 1 or slightly below, whereas other organic halides are effective at only a much higher ratio. However, it is a matter of the simplest of tests to determine operable and optimum quantities of any given catalyst system containing the components prescribed by the present invention, and such tests are well within the skill of those familiar with the art to which the invention appertains, using the procedural guidelines described herein and having now been informed by this disclosure of the particular types of modifying compounds which are to be used.

The amount of the titanium compound employed in the preferred catalyst systems which include compounds of this transition metal can also be defined relative to the aluminum compound, i.e., the mole ratio of organo-aluminum compound to the titanium compound varies from about 0.15 to about 10, and is preferably from about 0.5 to about 10. In the case of the trialkyl aluminum-titanium trichloride catalyst systems, the mole ratio is preferably from about 1 to about 5.

Use in the catalyst systems of the invention of the described organic halide compounds generally tends to decrease the activity otherwise exhibited by the basic two-component Ziegler-Natta system. As already pointed out, the amount of the modifier which is used in the system must be limited so that this decreased activity does not occur to an extent that is undesirable. All other things being considered, the amount certainly must be limited so that the catalyst activity is not destroyed. The activity of the catalyst system can be noted by the rate at which a particular monomer is polymerized and by a comparison of such rate with the rate that prevails where the organo-aluminum compound and transition metal compound are utilized without the inclusion in the catalyst system of the organic halide compound. Decreased catalyst activity, which results in a decreased rate of reaction, can be partially compensated by a change in several reaction variables, such as by increasing the amount of catalyst, increasing the temperature, or increasing the pressure. Reaction variables, such as pressure, temperature and time of reaction, will be discussed in greater detail hereinafter.

The monomers which are polymerized through the use of the catalysts of this invention are defined broadly as polymerizable, ethylenically unsaturated hydrocarbon monomers, or differently described, as vinyl hydrocarbons. A preferred class of these compounds is the aliphatic 1-olefins, such as, for example, ethylene, propylene, 1-butene, 1-hexene, 1-octene, and the like. Internal olefins and branched chain olefins can also be polymerized, such as 2-pentene and isobutylene. In addition, cyclic olefins, such as cyclopentene and cyclohexene can also be polymerized. The polymerizable, ethylenically unsaturated monomers also include the aryl olefins, for example, styrene and the alkyl substituted styrenes. The alkyl substituted ethylenes can also be employed, such as 2-methylbutene-1, 4-methylpentene-1 and the like. Polyolefins in which double bonds are in either the conjugated or non-conjugated positions can also be employed. These include, for example, 1,5-hexadiene, 1,4-pentadiene, 1,4-octatriene, isoprene, 2-phenylbutadiene and the like. It is also within the scope of the invention to polymerize mixtures of two or more of any of the monomers of the type previously set forth to produce the corresponding copolymers rather than a homopolymer.

The invention is of particular significance with respect to the polymerization of those monomers which are capable of yielding polymers having an isotactic molecular structure in which the repeating side groups along the carbon chain are of a regular arrangement. This geometry imparts to the isotactic polymer a high degree of crystallinity. Monomers which may be polymerized through the use of the present invention to produce improved yields of isotactic polymer include, but are not limited to, propene, butene and styrene.

In the case of vinyl chloride, vinyl fluoride and 2-chloropropene, the prior art has suggested the use of these materials in a relatively low halide to aluminum atomic ratio for the purpose of reducing the molecular weight, as determined by inherent viscosity measurements) of polyolefin products. Use of these materials in the amounts heretofore prescribed has not appreciably changed the stereo regularity of the polymer. When used in substantially larger amounts, however, we have determined that these particular organic halides continue to exert a strong molecular weight lowering effect, but also generate polyolefins which appear to be highly isotactic. The isotaxy of the polymers produced when using these modifier materials in such increased quantities is difficult to ascertain by the conventional heptane extraction technique, since the lowering of molecular weight which is effected also increases the solubility of the more isotactic fractions of the polymer in the heptane solvent. In other words, when relatively large amounts of vinyl halide, vinyl fluoride and 2-chloropropene are incorporated in the catalyst, the inherent viscosity of the polymer product is reduced to less than 1, which indicates a polymer of sufficiently low molecular weight to be relatively soluble in boiling heptane.

In the case of trichloroethylene, we have determined that this organic halide compound is highly useful as a reaction medium for ethylene polymerization, and simultaneously serves to lower the molecular weight of the polyethylene produced therefrom. The trichloroethylene modifier may also be utilized as a medium in the polymerization of propene, and in such polymerization, has been found to simultaneously increase the isotaxy of the polymer product while effectively lowering the molecular weight of the product. We prefer, however, to provide a polymerization medium which consists essentially of a 50:50 volume percent heptane-trichloroethylene solution for propene polymerizations, rather than a pure trichloroethylene polymerization medium.

The catalyst systems of the invention are preferably prepared as dispersions in the reaction medium solvent or diluent, and the polymerization reaction is subsequently carried out in the presence of this solvent. The organic diluent or reaction medium used, other than trichloroethylene in the manner described above, is preferably an aliphatic or aromatic hydrocarbon and may be selected from such compounds as pentane, hexane, heptane, isooctant, cyclohexane, methyl cyclopentane, benzene, toluene, and the like. In general, aliphatic hydrocarbons containing from 7 to 9 carbon atoms are preferred to those containing fewer carbon atoms, and heptane has been found to be a highly suitable medium for the polymerization of propene, and is probably the most preferred of those which are suitable.

The catalyst components are brought together in the absence of air and moisture in the inert hydrocarbon diluent, with the organic halide compound and the organo-aluminum compound preferably, though not necessarily, being introduced to the hydrocarbon diluent prior to the addition of the titanium halide. It is further preferable, but not mandatory, to have the organic halide present before the organo-aluminum compound and the titanium halide are mixed. In other words, the most preferred procedure is to bring the organo-aluminum compound and organic halide together in the inert diluent initially, and the least preferred procedure is to bring the trialkyl aluminum and titanium halide together prior to the addition of the organic halide to the diluent. After combining the catalyst components in the inert diluent, the monomer or mixture of monomers to be polymerized is then introduced to the polymerization vessel at some convenient pressure.

In some instances, it will be preferred to age the organo-aluminum compound and the organic halide in the inert reaction medium for varying periods of time prior to the addition of the titanium halide to the catalyst system. In the majority of cases, however, aging of two of the three catalyst components does not appear to significantly affect the results obtained. Also, in some polymerizations, the aluminum compound and organic halide are preferably heated together for a time before the titanium halide and monomer are added to the system. Such pre-reaction or preheating is not universally necessary, however, and the advantage, if any, accruing from this step may be easily determined in the case of each separate catalyst system to be used and the polymerization which is to be effected.

The pressure at which the polymerization is carried out is dependent upon the monomer which is to be polymerized and other variables. In general, the reaction pressure is sufficiently high to maintain the inert diluent which is employed in a liquid state under the prevailing reaction conditions. In most instances, the polymerization reaction is suitably carried out at atmospheric pressure or higher. However, the pressure can vary widely from slightly below atmospheric up to several thousand pounds per square inch. While high pressures are not required in order to promote the reaction, they will have a desirable effect on the reaction rate and, in some instances, on the polymer quality. The choice of whether or not to use an appreciably elevated pressure will be based upon economic and practical considerations, taking into account the advantages that can be obtained thereby. In general, however, the pressure employed will range between atmospheric and about 200 p.s.i.g.

In the course of the polymerization reactions, the catalyst and monomer are preferably intimately contacted by agitating the system by suitable stirring or other means. However, in many instances, the polymerization mixture can be allowed to remain quiescent while the polymerization takes place. The polymerizaiton can be effected by a batch method, or by a continuous process, such as, for example, by passing the reaction mixture through an elongated reaction tube which is contacted externally with suitable cooling media to maintain a desired reaction temperature.

Polymerization processes employing the catalyst system of the invention can be carried out over a wide range of temperatures with the particular preferred temperature again being chosen in accordance with the particular monomer to be polymerized, the pressure employed, the particular catalyst used in the system, and other reaction variables. In general, the polymerization reaction is carried out at as low a temperature as is feasible, usually between 0° C. and 150° C. In most instances, the temperature may be maintained within the range of from about 25° C. to about 100° C. As hereinbefore indicated, increasing the temperature at which the polymerization reaction is carried out increases the reaction rate, and operation at higher temperatures may therefore be desirable where a particular catalyst system relatively severely reduces the reaction rate though yielding a highly isotactic polymer product.

The time required to carry out the polymerization reaction is dependent upon most of the variables which have already been described as affecting the temperature and pressure which are to be employed in the process. Broadly, the reaction time can be varied from about as low as a few minutes, for example, two minutes, to as high as 100 hours. Generally, however, in a batch process, the reaction is carried out over a period of from about 4 to about 24 hours.

The polymer products produced by the process of the invention can be recovered from the total reaction mixture by a wide variety of procedures, most of which are conventional and well understood by those skilled in the art, and which are chosen in accordance with the properties of the particular polymer produced, the presence or absence of solvent at the end of the polymerization run, and the like. It is generally desirable to remove as much of the catalyst as possible, and this is conveniently done by contacting the total reaction mixture, or the polymer after separation from the solvent, etc., with methanolic hydrochloric acid, with an aliphatic alcohol such as methanol, isobutanol, secondary butanol, or by various other procedures. If the polymer is insoluble in the solvent, it can be separated therefrom by filtration, centrifuging or other suitable physical techniques. If the polymer is soluble in the solvent, it is advantageously precipitated by admixture of the solution with a non-solvent, such non-solvent usually being an organic liquid miscible with the solvent, but in which the polymer to be recovered is not readily soluble. Of course, any solvent present can also be separated from the polymer by evaporation, care being taken to avoid subjecting the polymer to too high a temperature in such operation.

For the purpose of illustrating some of the various aspects and advantages of the invention, the following examples are given.

The following examples may be better understood if certain definitions of terms are preliminarily set forth. The data presented in the tables and examples are calculated using these definitions and formulae.

(1) Insoluble polymer: the solid polymer isolated as an initial precipitate in the polymer work-up procedures.

(2) Soluble polymer: material isolated from the filtrate from, and subsequent washings of, insoluble polymer. This is part of the atactic fraction.

(3) Total polymer: the total of the soluble and insoluble polymer produced as they are defined in (1) and (2).

(4) Percent conversion of monomer: monomer charged minus the monomer vented at the end of polymerization multiplied by 100 divided by the monomer charged.

(5) Isotactic index: the percent of insoluble polymer not extracted by refluxing normal-heptane.

(6) Total yield of isotactic polymer: the grams of insoluble polymer multiplied by the isotactic index divided by the grams of monomer converted.

In the majority of the examples, propene was chosen as a representative monomer, and its polymerization is illustrative of the improvement in the degree of isotaxy of polymer products which may be achieved through the use of the catalyst systems of the present invention. In Examples 1 through 5, a series of propene polymerizations was conducted using as the organo-aluminum component of the catalyst, a statistical mixture of trialkyl aluminum compounds produced by the random addition of ethylene to triethyl aluminum. Such statistical mixtures, known as "growth product," are produced by well known commercial processes and are described in U.S. Patents 2,971,969, 3,062,857, and 3,087,954. In general, as indicated in the cited patents, growth product typically contains a mixture of trialkyl aluminum compounds in which the alkyl substituents of the aluminum are varied in carbon chain length with the number of carbon atoms in the alkyl substituents ranging from 2 to about 30 and statistically distributed in accordance with a Poisson curve. In Examples 1 through 5, titanium trichloride was chosen as the representative transition metal compound constituting the second component of the catalyst system.

The polymerizations were conducted in dry cyclohexane at an aluminum to titanium mole ratio of 2. The organic halides were provided in several ways in the reactions, each of which used growth product as the organo-metallic compound. Thus, in Example 1, the growth product itself, which contains small amounts of α-olefin impurities, was reacted with elemental bromine, thereby generating the primary bromides and the dibromides derived from the α-olefin impurity. In Example 2, growth product was reacted with sufficient aluminum bromide to generate aluminum dialkyl bromide. Example 3 was a control run in which no organic halide component was included in the catalyst system. In Examples 4 and 5 pre-prepared organic halide compounds were added to the titanium trichloride and statistical mixture of trialkyl aluminum compounds (growth product) for the purpose of obtaining polypropylene of higher isotaxy.

EXAMPLE 1

Charge:

86.4 ml. cyclohexane (distilled and stored over $CaH_2$)
16.4 ml. (0.026 mole) standard solution made by adding growth product and bromine ($Br_2$) to a bottle containing cyclohexane
0.0013 mole titanium trichloride (aluminum activated)
8.2 grams propene, polymerization grade (at 50 p.s.i.g.)

Apparatus:

200 ml. beverage bottle capped with a rubber septum and a metal cap containing three small holes
Bottle polymerizer, designed so as to rotate the bottle over and over and in and out of a 75° C. water bath
Hypodermic needle and syringe

EXAMPLE 2

Charge:

90 ml. cyclohexane (distilled and stored over $CaH_2$)
10 ml. (0.0074 mole) standard solution made by adding growth product and $AlBr_3$ to a bottle containing cyclohexane
0.0037 mole titanium trichloride (aluminum activated)
7.6 grams propene, polymerization grade (at 50 p.s.i.g.)

Apparatus:

Same as used in Example 1.

Procedure.—In Examples 1 and 2, the charge was added to dry cyclohexane in argon flushed beverage bottles in the order shown above. Polymerization was allowed to continue for 4 hours at 75° C.

In each example, 50 ml. of isopropanol were added to the capped polymerization bottle by means of a hypodermic needle and syringe. The bottle and its contents were shaken and left to stand for about 30 minutes. The cap was then removed and the contents transferred to a Waring Blendor containing 300 ml. of isopropanol. The bottle was rinsed with an additional 100 ml. of isopropanol and the rinse material was added to the blender. The blender was turned on to a high speed and left on for approximately 5 minutes. The mixture was then filtered through a fritted glass funnel to give a polymer filter cake and filtrate. The filtrate was poured into a weighed 600 ml. beaker and evaporated to dryness on a steam cone. Any weight increase due to soluble material was recorded. The filter cake was again placed in the blender and blended for approximately 5 minutes with 450 ml. of isopropanol and 250 ml. of water. The mixture was filtered as before. The filtrate was discarded.

The filter cake was then blended as before with a final wash containing 250 ml. of isopropanol and 250 ml. of water. Again, the mixture was filtered and the filter cake washed on a fritted glass funnel with approximately 50 ml. of methyl alcohol. The filtrate was discarded and the semidry polymer was transferred to a weighed open dish and placed in a 60° C. vacuum oven equipped with a nitrogen bleed in line. The polymer was left in the oven for 18 to 24 hours and then removed, allowed to cool and weighed. A portion of the solid polymer thus obtained was extracted in refluxing n-heptane.

EXAMPLE 3

Example 3 was a control run in which the polymerization procedure described in Examples 1 and 2 and the polymer work-up procedure there described were followed. No organic halogen compound was added to the catalyst mixture, and thus only the titanium chloride and growth product were used in the catalyst.

EXAMPLES 4–5

Two polymerization runs were carried out using catalysts which contained two different organic halide modifiers, and using the statistical mixture of trialkyl aluminum compounds (growth product) identified above as the organo-aluminum compound, and titanium trichloride as the transition metal halide.

Apparatus and equipment:

Same as in Examples 1 and 2.

Reagents:

Cyclohexane
Growth product (statistical mixture of trialkyl aluminum compounds as hereinbefore identified)
Titanium trichloride (aluminum activated)
Propene
1,2-dibromooctane (used in Example 4)
p-Dodecylbenzyl chloride (used in Example 5)

Procedure.—A clean unused beverage bottle of 220 ml. capacity was stored for 24 hours or longer in a 100° C. oven. The bottle was then removed from the oven and purged with argon until cool. 100 ml. of the polymerization solvent, cyclohexane, were then introduced to the bottle and the bottle was momentarily purged with argon for a second time. The bottle was stoppered and placed in a dry box where the mixture of trialkyl aluminum compounds and the selected organic halide compound (either 1,2-dibromooctane or dodecylbenzylchloride) was added to the cyclohexane.

The titanium trichloride was added last to the polymerization bottle. The rubber septum was then placed over the bottle and the bottle removed from the dry box and immediately capped. The bottle was weighed and propene was injected into the polymerization bottle at 40 p.s.i.g. The propene was added until bubbling substantially ceased. The polymerizations were carried out, the samples of polymer worked up, and the degree of isotaxy tested by hot normal hexane solubility as described above in referring to Examples 1 and 2.

The data obtained in runs 1 through 5 are set forth in Table I. These data clearly indicate that a higher degree of isotaxy was achieved in the polymer product when organic halides were utilized in the catalyst system than was achieved in a control polymerization when the organic halide modifier was absent from the catalyst system. The data further indicate that the small amount of olefin impurity in the statistical mixture of trialkyl aluminum compounds may be brominated to provide an alkyl bromide which effects some improvement in the isotaxy of the polymer product obtained when the mixture containing such bromide is used in combination with titanium trichloride to effect the polymerization of propene.

TABLE I

| | Example [1] | | | | |
|---|---|---|---|---|---|
| | 1 | 2 | 3 (Control) | 4 | 5 |
| Millimoles of $AlR_3$ Growth [2] Product Charged | 2.6 | 7.0 | 6.0 | 5.0 | 7.0 |
| Halide Used to Halogenate Growth Product | Bromine ($Br_2$) | $AlBr_3$ | None | 1,2-dibromooctane | [3] DBCL |
| Millimoles of Halide Charged | 1.3 | 3.5 | | 5.0 | 5.0 |
| Possible Products of Halide-Growth Product Reaction | $AlR_2Br$, $RBr$, and $RCHBrCH_2Br$ | $AlR_2Br$ | | $AlR_2Br$, $C_6H_{13}RCHCH_2Br$ | $AlR_2Cl$, 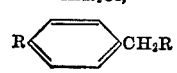 |
| Millimoles of $TiCl_3$ Charged | 1.3 | 3.7 | 3.1 | 2.6 | 2.9 |
| Al/Halogen/Ti Ratio (Approximate) | 2/2/1 | 2/3/1 | 2/0/1 | 2/4/1 | 2/2/1 |
| Percent Conversion of Propene to Insoluble Polymer | 90.2 | 88.0 | 76.5 | 81.5 | 83.0 |
| Isotactic Index | 81.5 | 69.7 | 53.1 | 71.5 | 62.4 |
| Percent Yield of Isotactic Polypropylene | 73.5 | 61.4 | 40.6 | 58.0 | 51.8 |
| Inherent Viscosity | 2.85 | 2.87 | 2.91 | 4.83 | 1.91 |

[1] In all of the Example 1–5 runs, cyclohexane was used as the reaction solvent.
[2] In all of the Example 1–5 runs, the organo aluminum component of the catalyst system was a mixture of trialkyl aluminum compounds in which the alkyl substituents of the aluminum contained varying numbers of carbon atoms with such variation ranging from 1 to about 30 in a Poisson statistical distribution. This material is designated as $AlR_3$ growth product.
[3] Dodecylbenzyl chloride.

EXAMPLES 6-11

Six polymerization runs were made to determine the relative advantages of polymerization of propene in cyclohexane inert reaction medium versus polymerization in normal heptane. Three identical runs were made using cyclohexane, and three identical runs using normal heptane. In each case, the organo-aluminum material used in the catalyst was growth product of the type hereinbefore described, and the organic halide ingredient of the catalyst was provided by brominating a portion of the growth product to produce $AlR_2Br$ and $RBr$ (where R represents an alkyl group). The aluminum to titanium mole ratio employed was approximately 2 to 1 in each run as 7.4 millimoles of the statistical mixture of trialkyl aluminum compounds were used in the catalyst in each run, and 3.6 millimoles of titanium trichloride were employed.

Propene was injected into the polymerization bottles at 40 p.s.i.g. and the bottles were agitated at a temperature of 75° C. for a period of 4 hours. The polymerization and work-up were conducted using the standard procedures heretofore described under Examples 1-5. The data obtained in Examples 6-11 are presented in Table II and show that propene polymerization carried out in n-heptane gives polymers of substantially greater stereo regularity than can be obtained when cyclohexane is used as the polymerization solvent.

After polymerization, the bottles were brought to room temperature and vented. Usually, nearly 100 percent of the propene was polymerized.

The contents of the bottle were then transferred to a Waring blender, slurried with 450 ml. of isopropanol and filtered. The insoluble polymer with then twice again washed in the blender, first with 250 ml. of water and 450 ml. of isopropanol and then with 250 ml. of water and 250 ml. of isopropanol. After the final wash, the filter cake was washed with 50 ml. of methanol and worked up in the manner hereinbefore described.

Procedure B.—In polymerization procedure B, substantially the same procedure was followed as that used in procedure A except that (1) the solution containing triethyl aluminum and organic halide was agitated overnight at 75° C. instead of 2 hours, (2) an aluminum compound to titanium compound mole ratio of 4 instead of 2 was used, and (3) after injection of propene into the polymerization bottles, the bottles were agitated overnight at 75° C. instead of only 4 hours.

After polymerization, the bottles were brought to room temperature and vented. Except as noted in the table, all polymerizations gave substantially complete conversion to propene. After deactivation of the catalyst by the addition of 20 ml. of isopropanol, the mixture was slurried in a Waring blender with 200 ml. of water and

TABLE II

| Example | Solvent (100 ml.) | Millimoles of $TiCl_3$ Charged | Grams of Propylene Charged | Grams of Insoluble P.P.* Obtained | Percent Conversion of Propylene to Insoluble P.P. | Isotactic Index | Percent yield of Isotactic P.P. | $N_{inh}$ |
|---|---|---|---|---|---|---|---|---|
| 6 | Cyclohexane | 3.6 | 8.3 | 7.4 | 89.2 | 66.5 | 59.4 | 1.72 |
| 7 | do | 3.6 | 8.8 | 7.8 | 88.7 | 75.3 | 66.8 | 1.98 |
| 8 | do | 3.7 | 8.3 | 7.3 | 88.1 | 73.1 | 64.5 | 1.97 |
| 9 | n-Heptane | 3.7 | 8.6 | 7.4 | 86.0 | 93.5 | 80.2 | 2.02 |
| 10 | do | 3.0 | 9.1 | 7.8 | 85.8 | 94.1 | 80.8 | 2.13 |
| 11 | do | 3.6 | 8.6 | 7.3 | 84.9 | 93.5 | 79.4 | 2.10 |

*P.P. is used to indicate polypropylene.

EXAMPLES 12-68

A large number of propene polymerization runs were carried out to study the effectiveness of various organic halide compounds on the course of polymerization of propene and the isotaxy of the polypropylene produced using triethyl aluminum-titanium trichloride catalyst systems which included such organic halides. Several procedures were employed which differed somewhat in their details, but in all of the procedures, the following reagents were used: Triethyl aluminum, titanium trichloride (aluminum activated), dry heptane and polymerization grade propene. The organic halides which were used are commercially available. All of the polymerization runs were conducted in thick walled beverage bottles of about 220 ml. capacity.

The polymerization procedures which were utilized in Examples 12-68 will next be described.

Procedure A.—Polymerization bottles, dried at 105° C. were cooled under argon. 100 ml. of dry n-heptane were transferred to the bottles under argon. In a nitrogen flushed dry box, triethyl aluminum and the particular organic halide to be used were transferred to the bottle with hypodermic syringes. The bottles were capped with neoprene septa and then agitated at 75° C. for 2 hours. After cooling to room temperature, the bottles were placed in the dry box where titanium trichloride was added from weighed vials. The aluminum to titanium mole ratio used in all runs was 2. After being recapped, the bottles were pressured to 40 p.s.i.g. with propene (7 to 9 grams) which was introduced using a hypodermic syringe. The bottles were then agitated at 75° C. for 4 hours.

100 ml. of heptane. The mixture was then transferred to a separatory funnel. An upper organic layer containing suspended polypropylene, and a lower cloudy aqueous layer were now present. After the addition of about 25 ml. of concentrated hydrochloric acid, and thorough mixing, a clear aqueous layer was discarded. Following two washings with cold water, the organic layer was diluted with 200 ml. of isopropanol and filtered through a Whatman 41H filter paper. The solid polymer was recovered by concentration of the filtrate in a steam bath. The insoluble polymer was slurried with 300 ml. of isopropanol in a blender and then recollected by filtration.

Procedure C.—This procedure differs from procedure B described above only in the catalyst preparation. In procedure C, the catalyst components were all mixed together without heating the triethyl aluminum and the organic halide. The catalyst addition order was organic halide, triethyl aluminum and titanium trichloride. The remainder of the polymerization procedure was identical to that of procedure B.

The insoluble polypropylene as obtained by procedures A, B or C was dried overnight at 50° C. to 60° C. in an evacuated oven through which was passing a small stream of nitrogen. The dry polymer was then extracted with boiling heptane using a vapor jacketed extractor. The reported value of percent heptane insolubles set forth in Table III hereinafter is based on the total propene consumed (procedure A) or on the total isolated soluble and insoluble polymer (procedures B and C.) The inherent viscosity was determined in Decalin at 135° C. at 0.1 gram per 100 ml.

TABLE III

| Example | Organic Halide | Procedure | Halogen/Aluminum Atomic Ratio | Ti Conc. (mMolar) | Percent Heptane Insolubles | Inherent Viscosity | Remarks |
|---|---|---|---|---|---|---|---|
| 12 | None (control runs—7 runs made) | C | | 2 | 50-69 | 2.0-2.6 | |
| 13 | 1,2-dibromooctane | A | 2 | | 73 | 1.97 | |
| 14 | p-Dodecylbenzyl chloride | A | 1 | | 78 | 2.14 | |
| 15 | Benzyl chloride | A | 1 | | 80 | 1.64 | |
| 16 | Allyl chloride | A | 1 | | 77 | 2.01 | |
| 17 | Tert-butyl chloride | A | 1 | | 86 | 1.40 | |
| 18 | Chloroform | A | 1 | | 80 | 2.20 | |
| 19 | Benzotrichloride | A | 1 | | 79 | 2.86 | |
| 20 | p-Chlorobenzyl chloride | A | 1 | | 78 | 1.87 | |
| 21 | Tert-butyl bromide | A | 1 | | 80 | 2.44 | |
| 22 | Alpha-bromoethylbenzene | A | 1 | | 78 | 4.18 | |
| 23 | Bromotrichloromethane | A | 1 | | 83 | 2.11 | |
| 24 | Benzhydryl chloride | A | 1 | | 79 | 2.19 | |
| 25 | p-Bis-(chloromethyl)benzene | A | 1 | | 79 | | |
| 26 | Propargyl chloride | B | 1 | 14 | 94 | 5.13 | |
| 27 | 1,1,1-trichloroethane | B | 1 | 13 | 89 | 2.26 | |
| 28 | 1,1,1,5-tetrachloropentane | B | 1.3 | 15 | 85 | 2.50 | |
| 29 | 1,1,1-trichloroundecane | B | 1 | 15 | 85 | 2.88 | |
| 30 | 2,2-dichloropropane | B | 1 | 15 | 84 | | |
| 31 | Trichlorofluoromethane | B | 1 | 12 | 84 | 2.87 | Cl₃CF equally effective when X/Al=2. |
| 32 | Carbon tetrachloride | B | 1 | 15 | 85 | 2.67 | |
| 33 | do | B | 1.5 | 15 | 85 | 2.67 | |
| 34 | Bromoform | B | 3 | 9 | | | Very little insoluble polymer formed. 83% conversion of propene. |
| 35 | do | B | 1.5 | 13 | 82 | 1.71 | |
| 36 | do | B | 1 | 15 | 88 | 2.94 | |
| 37 | do | B | 0.5 | 14 | 50 | | |
| 38 | Carbon tetrabromide | C | 2 | 15 | 82 | | |
| 39 | do | B | 1.5 | 15 | 89 | 2.90 | |
| 40 | do | B | 1 | 15 | 80 | 3.09 | |
| 41 | Iodoform | B | 3 | 15 | | | Very little insoluble polymer formed. |
| 42 | do | B | 2 | 14 | 94 | 3.41 | |
| 43 | do | B | 1 | 14 | 79 | 3.02 | |
| 44 | Hexachloroethane | B | 6 | 16 | 66 | 1.80 | |
| 45 | do | B | 4 | 14 | 84 | 2.77 | |
| 46 | do | B | 2 | 13 | 74 | 2.62 | |
| 47 | 1,1,2,2-tetrachloroethane | B | 100 | 13 | 57 | 2.65 | |
| 48 | do | B | 20 | 15 | 85 | 2.62 | |
| 49 | do | B | 4 | 15 | 81 | 2.48 | |
| 50 | do | B | 2 | 14 | 75 | 2.59 | |
| 51 | Methylene chloride | B | 280 | 14 | 54 | | CH₂Cl₂ was 50 vol. percent of solvent. |
| 52 | do | B | 100 | 13 | 81 | 1.71 | |
| 53 | do | B | 20 | 15 | 75 | 1.53 | |
| 54 | do | B | 8 | 14 | 72 | 1.83 | |
| 55 | do | B | 4 | 13 | 64 | 1.88 | |
| 56 | 1,1-dichlorobutane | B | 4 | 15 | 79 | 2.14 | |
| 57 | do | B | 3 | 15 | 83 | 2.51 | |
| 58 | do | B | 1 | 14 | 75 | 2.34 | |
| 59 | Trifluoroiodomethane | B | 8 | 13 | 88 | 3.40 | Only iodine atoms used for calculating halogen/Al ratio. |
| 60 | do | B | 4 | 15 | 85 | 2.50 | |
| 61 | do | B | 2 | 16 | 75 | 1.77 | |
| 62 | Trichloroethylene | B | | 15 | 88 | 3.26 | Solvent 50 vol. percent trichloroethylene. |
| 63 | do | B | 50 | 12 | 92 | 3.50 | |
| 64 | do | B | 8 | 12 | 56 | | |
| 65 | 1,2,3,4,5,6-hexachlorocyclohexane | B | 4 | 12 | 88 | 2.55 | |
| 66 | do | B | 2.2 | 15 | 81 | 3.69 | |
| 67 | do | A | 1 | | 67 | 2.86 | |
| 68 | Vinyl chloride | C | 9 | 15 | High | 0.47 | Polymer appeared highly isotactic, but seems to be low mol. wt. |

As shown by the results listed in Table III, many different organic halides beneficially modified the triethyl aluminum-titanium trichloride catalyst system to give polypropylene of improved isotaxy. Without the addition of the catalyst modifier, the heptane insoluble portion of the polypropylene is from about 50 to about 69 percent, whereas using an effective organic halide catalyst modifier in the proper amount, heptane insoluble portions of 80 percent and higher are frequently obtained.

EXAMPLES 69–83

A number of additional propene polymerization runs were carried out using various organic halide compounds as the third component of a triethyl aluminum-titanium trichloride containing catalyst system. In each of the runs, the order of addition of the catalyst components to the n-heptane solvent was, first, the addition of the aluminum triethyl, then, the addition of the organic halide compound followed, after an aging time of either 1.5 or 2 hours, by the addition of the titanium trichloride. The data obtained in the runs and the conditions employed therein are set forth in Table IV.

TABLE IV

| Ex. | Organic Halide Used | Millimoles of Organic Halide Charged | Millimoles of Aluminum Triethyl Charged | Millimoles of TiCl₃ Charged | Al/X/Ti Atomic Ratio (X=Halogen) | Aging Time (in Hours) at 750° C. of Two of the Three Compounds | Percent Conversion of Propylene to Insoluble P.P.* | Isotactic Index | Persent Yield of Isotactic P.P. | $N_{ink}$ |
|---|---|---|---|---|---|---|---|---|---|---|
| 69 | Benzyl Chloride | 4.0 | 4.0 | 2.0 | 2/2/1 | 1.5 | 92.6 | 86.6 | 80.1 | 1.64 |
| 70 | Allyl Chloride | 4.0 | 4.0 | 2.0 | 2/2/1 | 1.5 | 96.0 | 77.3 | 74.1 | 2.01 |
| 71 | Tertiary Butyl Chloride | 4.0 | 4.0 | 2.0 | 2/2/1 | 1.5 | 96.2 | 85.7 | 82.5 | 1.40 |
| 72 | Chloroform | 2.0 | 6.0 | 3.0 | 2/2/1 | 2.0 | 92.4 | 86.4 | 79.7 | 2.2 |
| 73 | None (control) | None | 3.0 | 1.5 | 2/0/1 | | 96.5 | 54.5 | 52.6 | 2.36 |
| 74 | do | None | 3.0 | 1.5 | 2/0/1 | | 95.8 | 54.9 | 52.6 | 1.72 |
| 75 | Chloroform | 1.3 | 3.3 | 2.0 | 1.7/2/1.2 | 2.0 | 91.7 | 85.1 | 78.1 | 2.05 |
| 76 | α,α,α-trichlorotoluene | 1.3 | 3.3 | 2.0 | 1.7/2/1.2 | 2.0 | 92.1 | 85.9 | 79.0 | 2.86 |
| 77 | 1,2,3,4,5,6-hexachlorocyclohexane | 0.7 | 3.3 | 2.0 | 1.7/2/1.2 | 2.0 | 92.1 | 72.1 | 66.5 | 2.30 |
| 78 | Para-Chlorobenzyl Chloride | 4.0 | 3.3 | 2.0 | 1.7/2/1.2 | 2.0 | 92.5 | 83.8 | 77.6 | 1.87 |
| 79 | Tertiary butylbromide | 4.0 | 3.3 | 2.0 | 1.7/2/1.2 | 2.0 | 91.8 | 87.1 | 80.0 | 2.44 |
| 80 | 1-bromoethylbenzene | 4.0 | 3.3 | 2.0 | 1.7/2/1.2 | 2.0 | 87.5 | 89.0 | 77.9 | 4.18 |
| 81 | Bromotrichloromethane | 1.0 | 3.3 | 2.0 | 1.7/2/1.2 | 2.0 | 96.4 | 86.6 | 83.4 | 2.11 |
| 82 | Chlorodiphenylmethane | 4.0 | 3.3 | 2.0 | 1.7/2/1.2 | 2.0 | 95.0 | 83.0 | 78.9 | 2.19 |
| 83 | 1,2-dibromooctane | 5.0 | 5.0 | 2.8 | 2/4/1.2 | 2.0 | 91.9 | 79.8 | 73.4 | 1.22 |

*P.P. is used to indicate polypropylene.

In order to study the effect of various polymerization reaction variables on the isotaxy of the polymers produced, several specific organic halide compounds were used as components in various catalyst systems, and the manner of preparing the catalyst and other variables were studied.

EXAMPELS 84–93

In Examples 84–93, catalyst systems comprising chlorotriphenyl methane, titanium trichloride and a trialkyl aluminum compound were used, and several control runs in which the organic halide was omitted, were carried out. In these runs, the type of reaction solvent or inert diluent was varied and the aluminum to titanium mole ratio was varied by varying the amount of titanium trichloride added during the runs.

Procedure.—50 to 100 ml. of the solvent was transferred under argon to a thick walled polymerization bottle of about 200 ml. capacity which contained a weighed amount of chlorotriphenyl methane. The bottles were then placed in a nitrogen flushed dry box where titanium trichloride and the trialkyl aluminum were added in the order described in Table V. The trialkyl aluminum and chlorotriphenyl methane were used in equi-molar amounts in all of the runs. Addition of the trialkyl aluminum to the chlorotriphenyl methane solution generated an opaque yellow suspension which changed in from about 5 to about 10 minutes to a clear yellow solution.

The bottles were then sealed with a neoprene septum cap and pressured to 40 p.s.i.g. with propene (about 10 grams of propene per 100 ml. of solvent). Heating the bottles overnight at 75° C. with agitation gave essentially quantitative polymerization. The polymer isolation procedure hereinabove described were used.

The data obtained in the runs represented by Examples 84–93 are presented in Table V. The value for the percent heptane insoluble polymer recovered is based on the total polymer formed, both soluble and insoluble.

when triethyl aluminum is the organo-aluminum component of the catalyst rather than the growth product hereinbefore described.

EXAMPLES 94—102

The polymerization reaction variables were further studied using a catalyst system which included triethyl aluminum, dodecylbenzyl chloride and titanium trichloride. In the runs represented by Examples 94–102, the effect of varying the mole ratio of the organic halide to aluminum triethyl was studied, as was the effect of varying the aging time of these two components before adding titanium trichloride, and the effect of varying the order of addition of the three components of the catalyst system. Standard polymerization procedures as heretofore described were employed, and the polymer product was worked up in accordance with the techniques set forth above. In each of the runs, 2 millimoles of triethyl aluminum was employed and 1 millimole of titanium trichloride. Normal heptane was employed as the reaction solvent in each case. The polymerization bottles were pressured only once to 40 p.s.i.g. with propene, and were then agitated at 75° C. for 4 hours. The results obtained in the polymerization runs represented by Examples 94–102 are reported in Table VI.

TABLE VI

| Examples | Millimoles of Dodecyl benzene Chloride Charged | Al/Cl/Ti Atomic Ratio | Order of Mixing | Aging Time at 75° C. (in Hours) of Two of the Three Compounds | Grams of Propylene Converted | Grams of Insoluble P.P.* Obtained | Percent Conversion of Propylene to Insoluble P.P. | Isotactic Index | Percent Yield of Isotactic P.P. | $N_{inh}$. |
|---|---|---|---|---|---|---|---|---|---|---|
| 94 | 1.0 | 2/2/1 | Al/Cl/Ti | 1.5 | 7.0 | 6.8 | 97.1 | 46.3 | 45.0 | |
| 95 | 2.0 | 2/4/1 | Al/Cl/Ti | 1.5 | 7.2 | 6.6 | 91.7 | 90.4 | 82.8 | 1.47 |
| 96 | 4.0 | 2/1/1 | Al/Cl/Ti | 1.5 | 1.3 | Trace | | | | |
| 97 | 1.0 | 2/2/1 | Cl/Ti/Al | 1.5 | 7.7 | 7.3 | 94.8 | 52.7 | 50.0 | |
| 98 | 2.0 | 2/4/1 | Cl/Ti/Al | 1.5 | 6.6 | 6.6 | 100.0 | 87.6 | 87.6 | 2.39 |
| 99 | 4.0 | 2/1/1 | Cl/Ti/Al | 1.5 | 1.7 | Trace | | | | |
| 100 | 1.0 | 2/2/1 | Al/Cl/Ti | Zero | 6.9 | 6.6 | 95.6 | 77.0 | 73.5 | 2.70 |
| 101 | 2.0 | 2/2/1 | Al/Cl/Ti | Zero | 7.6 | 7.2 | 94.7 | 87.5 | 82.9 | 1.91 |
| 102 | 4.0 | 2/4/1 | Al/Cl/Ti | Zero | 0.4 | Trace | | | | |

*P.P. is used to indicate polypropylene.

As indicated by the data set forth in Table VI, the mole ratio of the dodecylbenzyl chloride to triethyl aluminum was found to be critical. The 1:1 and 2:1 Al to Cl atomic ratios gave good propene polymerization with the greatest increase in isotaxy. Aging time was not found to be of much, if any, significance.

EXAMPLES 103–129

Chloroform was one of the organic halide compounds found to be quite effective in improving the isotaxy of propene polymerized by a catalyst system in which it was contained. Since it is a relatively cheap additive, this compound was investigated in detail. Twenty-seven runs

TABLE V

| Examples | Catalyst Preparation | Medium | Al/Ti Ratio | mMole Ti/ 100 ml. | Percent Heptane Insoluble | Inherent Viscosity |
|---|---|---|---|---|---|---|
| 84 | Et₃Al+ and Ph₃CCl* were mixed. TiCl₃ then added to resulting yellow solution. | Cyclohexane | 4.0 | 1.7 | 61 | |
| 85 | Et₃Al added to mixture of Ph₃CCl and TiCl₃ | do | 4.0 | 1.4 | 78 | |
| 86 | Et₃Al and Ph₃CCl were mixed. TiCl₃ then added to clear yellow solution. | Heptane | 4.0 | 1.3 | 88 | 2.89 |
| 87 | Et₃Al added to mixture of Ph₃CCl and TiCl₃ | do | 3.9 | 1.5 | 86 | 2.52 |
| 88 | R₃Al (Growth Product) mixed with Ph₃CCl. TiCl₃ added immediately. | do | 2.0 | 2.5 | 53 | 1.67 |
| 89 | R₃Al (Growth Product) mixed with Ph₃CCl. TiCl₃ added to clear yellow solution (after 10 minutes). | do | 2.0 | 2.5 | 75 | 2.83 |
| 90 | R₃Al (Growth Product) added to a mixture of Ph₃CCl and TiCl₃. | do | 2.0 | 3.3 | 69 | 1.99 |
| 91 | Et₃Al plus TiCl₃ (control) | do | 3.0 | 1.8 | 61 | |
| 92 | do | Cyclohexane | 3.0 | 2.0 | 57 | |
| 93 | R₃Al (Growth Product) plus TiCl₃ (control) | Heptane | 2.0 | 0.5 | 50 | |

+Et₃Al indicates triethyl aluminum.
*Ph₃CCl indicates chlorotriphenyl methane.

In referring to Table V, it can be seen that the use of chlorotriphenyl methane in the polymerization of propene increases the percent of polymer not extracted by refluxing heptane, especially when heptane is the inert polymerization solvent used as opposed to cyclohexane, and (Examples 103–129) were carried out using a catalyst system which included triethyl aluminum, titanium trichloride and chloroform. The data obtained in the polymerization runs represented by Examples 103–129 are set forth in Table VII.

TABLE VII

| Examples | Milli-moles of Aluminum Triethyl Charged | Milli-moles of Chloroform Charged | Milli-moles of TiCl₃ Charged | Atomic Ratio Cl/Al/Ti | Order of Addition to 100 ml. of n-Heptane (X=Chloroform) | Aging Time (in Hours) at 75° C. of Two of the Three Compounds | Grams of Insoluble P.P. Obtained | Percent Conversion of Propylene to Insoluble P.P.* | Isotactic Index | Percent Yield of Isotactic P.P. | $N_{inh}$ |
|---|---|---|---|---|---|---|---|---|---|---|---|
| 103 | 4.28 | 1.14 | 2.14 | 0.8/1/0.5 | Al/X/Ti | 2 | 6.6 | 94.3 | 85.7 | 80.8 | 2.11 |
| 104 | 4.76 | 1.27 | 2.38 | 0.8/1/0.5 | X/Ti/Al | 2 | 7.1 | 100.0 | 87.2 | 87.2 | 1.94 |
| 105 | 5.60 | 1.49 | 2.81 | 0.8/1/0.5 | Al/Ti/X | 2 | 6.6 | 90.4 | 76.3 | 69.0 | 2.55 |
| 106 | 5.70 | 1.52 | 2.85 | 0.8/1/0.5 | Al/X/Ti | 1 | 7.5 | 92.7 | 83.7 | 77.5 | 1.88 |
| 107 | 3.26 | 0.87 | 1.63 | 0.8/1/0.5 | X/Ti/Al | 1 | 7.9 | 96.4 | 90.9 | 87.6 | 2.50 |
| 108 | 4.52 | 1.20 | 2.26 | 0.8/1/0.5 | Al/Ti/X | 1 | 7.5 | 93.9 | 75.9 | 71.1 | 2.59 |
| 109 | 4.92 | 1.33 | 2.46 | 0.8/1/0.5 | Al/X/Ti | 0 | 8.0 | 98.8 | 84.8 | 83.8 | 2.44 |
| 110 | 5.36 | 1.43 | 2.68 | 0.8/1/0.5 | X/Ti/Al | 0 | 8.0 | 100.0 | 87.8 | 87.8 | 2.72 |
| 111 | 3.70 | 0.99 | 1.85 | 0.8/1/0.5 | Al/Ti/X | 0 | 8.0 | 96.4 | 85.4 | 82.4 | 2.36 |
| 112 | 3.02 | 1.00 | 1.51 | 1/1/0.5 | Al/X/Ti | 2 | 6.8 | 97.1 | 86.9 | 84.3 | 1.95 |
| 113 | 2.90 | 0.97 | 1.95 | 1/1/0.5 | X/Ti/Al | 2 | 6.6 | 97.1 | 86.0 | 83.6 | 2.13 |
| 114 | 2.48 | 0.85 | 1.24 | 1/1/0.5 | Al/Ti/X | 2 | 5.2 | 71.2 | 82.5 | 58.8 | 2.30 |
| 115 | 3.70 | 1.23 | 1.85 | 1/1/0.5 | Al/X/Ti | 1 | 7.8 | 96.4 | 85.4 | 82.1 | 1.91 |
| 116 | 3.52 | 1.17 | 1.76 | 1/1/0.5 | X/Ti/Al | 1 | 7.9 | 93.0 | 85.5 | 79.5 | 2.30 |
| 117 | 3.80 | 1.27 | 1.90 | 1/1/0.5 | Al/Ti/X | 1 | 7.4 | 86.1 | 79.9 | 68.7 | 2.82 |
| 118 | 4.48 | 1.49 | 2.24 | 1/1/0.5 | Al/X/Ti | 0 | 8.0 | 98.8 | 86.8 | 85.1 | 2.25 |
| 119 | 4.22 | 1.41 | 2.11 | 1/1/0.5 | X/Ti/Al | 0 | 7.9 | 95.3 | 88.7 | 84.5 | 2.44 |
| 120 | 3.70 | 1.23 | 1.85 | 1/1/0.5 | Al/Ti/X | 0 | 7.8 | 92.9 | 86.7 | 80.5 | 2.03 |
| 121 | 5.38 | 2.15 | 2.69 | 1.2/1/0.5 | Al/X/Ti | 2 | 6.3 | 94.0 | 86.2 | 81.1 | 1.49 |
| 122 | 4.92 | 2.06 | 2.46 | 1.2/1/0.5 | X/Ti/Al | 2 | 6.6 | 91.7 | 84.9 | 77.8 | 1.61 |
| 123 | 3.14 | 1.26 | 1.57 | 1.2/1/0.5 | Al/Ti/X | 2 | 4.7 | 64.4 | 80.2 | 51.6 | 2.98 |
| 124 | 4.32 | 1.73 | 2.16 | 1.2/1/0.5 | Al/X/Ti | 1 | 7.8 | 95.2 | 85.4 | 81.2 | 1.82 |
| 125 | 3.88 | 1.56 | 1.94 | 1.2/1/0.5 | X/Ti/Al | 1 | 8.2 | 90.2 | 87.0 | 78.4 | 2.06 |
| 126 | 4.28 | 1.71 | 2.14 | 1.2/1/0.5 | Al/Ti/X | 1 | 6.8 | 82.9 | 77.8 | 66.8 | 2.04 |
| 127 | 3.76 | 1.51 | 1.88 | 1.2/1/0.5 | Al/X/Ti | 0 | 8.8 | 96.8 | 86.8 | 84.0 | 3.15 |
| 128 | 4.32 | 1.73 | 2.16 | 1.2/1/0.5 | X/Ti/Al | 0 | 7.8 | 95.1 | 87.3 | 83.1 | 2.17 |
| 129 | 3.98 | 1.60 | 1.99 | 1.2/1/0.5 | Al/Ti/X | 0 | 8.1 | 96.4 | 85.3 | 82.4 | 1.96 |

*P.P. is used to indicate polypropylene.

As indicated by the data set forth in Table VII, the quality of the polymers produced using the triethyl aluminum-chloroform-titanium trichloride catalyst system is very much dependent upon such variables as (1) the atomic ratio of the chlorine to aluminum, (2) the order of addition to the reaction medium of the catalyst components, and (3) the aging time of two (the first two added) of the three components that make up the catalyst system. The data indicate that good polymerization results and substantial improvement in isotaxy of the polymer product can be obtained using a chlorine to aluminum atomic ratio of as low as, and perhaps slightly lower than, 0.8. The data also indicate that, if the aluminum and titanium compounds are added before the organic halide compound, the latter material should be added immediately and without aging of the first two components.

EXAMPLES 130–159

In order to further evaluate the effectiveness of carbon tetrachloride and chloroform as the organic halide components of catalyst systems of the invention, and to determine the effect of using diethyl aluminum hydride as the organo-aluminum compound of the system, a number of propene polymerization runs were made utilizing a catalyst system which included diethyl aluminum hydride, titanium trichloride and either carbon tetrachloride or

TABLE VIII

| Example | HAlEt₂,³ mm. | CCl₄, mm. | TiCl₃, mm. | Order of Mixing | Atomic Ratio Cl:Al¹ | Percent Propene Converted to Insoluble Polymer | Isotactic Index | Percent Yield of Isotactic Polymer | Remarks |
|---|---|---|---|---|---|---|---|---|---|
| 130 | 7.00 | 1.10 | 3.50 | Al/Cl/Ti | .63 | 93.3 | 53.7 | 50.1 | Catalyst aging time, zero, for all runs in this table, except 153 and 154. In examples 130 through 135, CCl₄ was taken from a freshly opened bottle. It was not dried before being used. |
| 131 | 6.80 | 0.98 | 3.40 | Al/Cl/Ti | .58 | 94.5 | 53.7 | 50.8 | |
| 132 | 6.38 | 1.08 | 3.29 | Al/Cl/Ti | .68 | 90.5 | 51.3 | 46.4 | |
| 133 | 5.68 | 0.96 | 2.84 | Al/Cl/Ti | .68 | 93.5 | 52.6 | 49.2 | |
| 134 | 6.66 | 2.20 | 3.33 | Al/Cl/Ti | 1.32 | 94.5 | 86.5 | 81.7 | |
| 135 | 7.54 | 2.48 | 3.77 | Al/Cl/Ti | 1.32 | 93.5 | 84.0 | 78.6 | |
| 136 | 8.04 | 2.90 | 4.02 | Al/Ti/Cl | 1.45 | 88.5 | 52.7 | 46.7 | The CCl₄ used in Examples 136 through 142 was dried and stored over CaH₂ before being used. |
| 137 | 8.12 | 3.00 | 4.06 | Al/Ti/Cl | 1.48 | 89.7 | 77.5 | 69.5 | |
| 138 | 8.18 | 3.40 | 4.09 | Al/Ti/Cl | 1.66 | 89.7 | 75.1 | 68.4 | |
| 139 | 8.18 | 3.40 | 4.09 | Al/Ti/Cl | 1.66 | 84.0 | 74.1 | 62.4 | |
| 140 | 8.30 | 3.73 | 4.15 | Al/Ti/Cl | 1.80 | 86.8 | 72.6 | 63.0 | |
| 141 | 8.40 | 3.78 | 4.20 | Al/Ti/Cl | 1.80 | 85.0 | 72.9 | 62.0 | |
| 142² AlEt₃ | 7.84 | 1.95 | 3.91 | Al/Ti/Cl | 1.00 | 100.0 | 88.1 | 88.1 | This run was made for comparison purposes.² |
| 143 | 9.10 | 2.50 | 4.56 | Al/Ti/Cl | 1.1 | 91.5 | 78.1 | 71.5 | The CCl₄ used in Examples 143 through 152 was dried and stored over CaH₂ before being used. |
| 144 | 8.90 | 2.48 | 3.45 | Al/Ti/Cl | 1.1 | 93.0 | 80.6 | 75.0 | |
| 145 | 6.70 | 2.25 | 3.75 | Al/Ti/Cl | 1.4 | 93.0 | 80.1 | 74.5 | |
| 146 | 7.50 | 2.26 | 3.77 | Al/Ti/Cl | 1.2 | 95.6 | 78.9 | 75.4 | |
| 147 | 4.36 | 1.09 | 2.18 | Al/Cl/Ti | 1.0 | 94.7 | 84.9 | 80.6 | |
| 148 | 5.02 | 1.25 | 2.51 | Al/Cl/Ti | 1.0 | 95.7 | 82.8 | 79.6 | |
| 149 | 5.72 | 1.63 | 2.86 | Al/Cl/Ti | 1.15 | 94.4 | 88.2 | 83.3 | |
| 150 | 5.78 | 1.66 | 2.89 | Al/Cl/Ti | 1.15 | 93.0 | 87.0 | 81.0 | |
| 151 | 3.98 | 1.14 | 1.99 | Al/Cl/Ti | 1.15 | 94.5 | 84.6 | 80.0 | |
| 152 | 4.52 | 1.30 | 2.26 | Al/Cl/Ti | 1.15 | 92.8 | 82.6 | 76.6 | |
| 153 | 4.82 | 1.20 | 2.41 | Al/Cl/Ti | 1.0 | 93.8 | 81.6 | 76.6 | In Examples 153 and 154 CCl₄ was added to the HAlEt₂ in 100 ml. of n-heptane. The mixture was aged for two hours at 75° C. before adding the TiCl₃ and propene to the bottles. Distilled and dried CCl₄ was used. |
| 154 | 3.84 | 0.98 | 1.97 | Al/Cl/Ti | 1.0 | 94.0 | 82.9 | 77.9 | |
| | | CHCl₃ | | | | | | | |
| 155 | 4.70 | 1.56 | 2.34 | Cl/Ti/Al | 1.0 | 97.4 | 87.0 | 84.7 | |
| 156 | 9.90 | 2.56 | 4.97 | Al/Ti/Cl | 0.8 | 94.3 | 76.4 | 72.0 | Catalyst mixed and used without aging in in Examples 156 through 159. |
| 157 | 9.26 | 2.38 | 4.63 | Al/Ti/Cl | 0.8 | 93.1 | 76.6 | 71.3 | |
| 158 | 11.78 | 4.70 | 5.39 | Al/Ti/Cl | 1.2 | 90.0 | 72.6 | 65.4 | |
| 159 | 10.40 | 4.14 | 5.18 | Al/Ti/Cl | 1.2 | 91.4 | 74.5 | 68.1 | |

¹ Aluminum to titanium mole ratio was 2=1 in all runs included in this table unless otherwise stated.
² Example 142 was a run in which triethyl aluminum was used instead of diethylaluminum hydride in order to compare the effect of using these two compounds as the organo-aluminum component of the catalyst.
³ The HAlEt₂ used contained the following in terms of mol percent: Al-Carbon bonds, 71.7; Al-Hydrogen bonds, 24.6; Al-Oxygen bonds, 3.7.

chloroform as the catalyst components. Polymerization procedure A hereinbefore described was employed. The aluminum to titanium mole ratio used in each case was 2:1, and 100 ml. of dry n-heptane was the reaction medium employed. The data obtained in the runs represented by Examples 130–159 are presented in Table VIII.

EXAMPLES 159–190

A series of polymerizations of propene were carried out using catalyst systems which included vinyl halides as the organic halide component of the catalyst system. Each of the catalyst systems used in the runs contained titanium trichloride as the transition metal halide. The organo-aluminum compounds used were triethyl aluminum and diethyl aluminum chloride. The titanium trichloride also contained ⅓ by weight aluminum trichloride. In some of the runs, a fourth component was included in the catalyst system which was konwn to be a Ziegler-Natta catalyst modifier effective for the purpose of improving the isotaxy of polymer products. These fourth component modifiers include carbon tetrachloride, phosphorus trichloride and benzoyl chloride. The polymerizations were conducted in n-heptane (except for the two examples indicated) and were carried out at 75° C. 15 millimoles of the titanium compound were employed and the aluminum to titanium mole ratio was either 2 or 4, as indicated. The data obtained in the course of the runs, and the amount of the particular vinylic halide used in each run are indicated in TABLE IX.

The propene was allowed to polymerize overnight. The total conversion of the propene was at least 90 percent in all of the runs except that represented by Example 167. The percent of heptane insoluble polymer was determined by extraction with boiling heptane. The inherent viscosity was determined in Decalin at 135° C. at 1 gram per liter concentration.

further fact that the isotaxy of the polymer product is, in many cases, substantially increased is surprising. It will be noted by those skilled in the art that the mole ratios of vinyl halide compound to organo-aluminum compound used in the catalyst systems producing the polypropylene of improved isotaxy are quite different from those heretofore proposed for these vinyl halides for the purpose of reducing the molecular weight of the polymer product.

Some of the vinyl halides, such as cis- and trans-1,2-dichloroethylene and 1,1-dichloroethylene have little influence on polymer molecular weight, but markedly increase the isotaxy of polypropylene prepared using these halides in the triethyl aluminum-titanium trichloride system. It has further been determined that trichloroethylene can also be used as the polymerization medium, but better results are obtained when it is mixed with an equal volume of heptane for this purpose. The value of a system in which the trichloroethylene can provide a substantial or major portion of the polymerization medium and, at the same time, catalyze the production of polymers of improved isotaxy will be readily apparent.

EXAMPLES 191–194

Four ethylene polymerization runs were carried out using vinylic halides as the organic halide compound of the catalyst system in order to study the effect of such systems on the polymerization of this monomer. The organo-aluminum component of the catalyst system was triethyl aluminum, and the transition metal halide employed was titanium tetrachloride. Polymerizations were conducted in heptane, trichloroethylene and tetrachloroethylene at autogenic temperature (30° C. to 60° C.) using a titanium tetrachloride concentration of 15 millimoles, and an aluminum compound to titanium compound mole ratio of 2. Ethylene was introduced into the polymeriza-

TABLE IX

| Ex. | Basic Catalyst System | Vinylic Halide | Halogen/Al Atomic Ratio | Percent Heptane Insoluble | Inherent Viscosity | Remarks* |
|---|---|---|---|---|---|---|
| 159 | Et₃Al and TiCl₃·⅓ AlCl₃ | CH₂:CHCl | 5.8 | 47 | 0.44 | Al/Ti Mole Ratio=4 |
| 160 | do | do | 2 | 51 | 0.73 | Do. |
| 161 | do | do | 0.5 | 55 | 1.05 | Do. |
| 162 | do | CH₂:CHF | 1 | 52 | 0.57 | |
| 163 | do | do | 0.5 | 78 | 0.78 | |
| 164 | do | CH₂:CClCH₃ | 2 | 71 | 0.32 | |
| 165 | do | do | 1 | 54 | 1.89 | |
| 166 | do | CH₂:CCl₂ | 8 | 83 | 2.42 | |
| 167 | do | trans-CHCl:CHCl | 40 | 92 | 2.70 | 85% conversion. |
| 168 | do | do | 16 | 78 | 3.22 | |
| 169 | do | cis-CHCl:CHCl | 40 | 66 | 2.66 | |
| 170 | do | do | 16 | 56 | 2.64 | |
| 171 | do | do | ca. 470 | 85 | | Solvent was 50 vol. percent modifier. |
| 172 | do | Ph₂C:CHCl | 2 | 56 | 1.97 | |
| 173 | do | do | 0.5 | 56 | 2.15 | |
| 174 | do | trans-PhCH:CClPh | 2 | 63 | 2.37 | |
| 175 | do | do | 0.5 | 64 | 2.41 | |
| 176 | do | CHCl:CCl₂→used as solvent | | 65 | 3.32 | Al/Ti Mole Ratio=4. 57% conversion. |
| 177 | do | CHCl:CCl₂→50 vol. percent of solvent | | 88 | 3.26 | Al/Ti Mole Ratio=4. |
| 178 | do | CHCl:CCl₂ | 50 | 92 | 3.50 | Do. |
| 179 | do | CHl₂:CCl₂→used as solvent | | 63 | 2.64 | Do. |
| 180 | do | None | | 50–69 | 2.0–2.6 | Control. |
| 181 | Et₃Al and TiCl₃·⅓ AlCl₃+Et₂AlCl | CH₂:CHCl | 0.8 | 90 | 1.33 | |
| 182 | Et₃Al and TiCl₃·⅓ AlCl₃+Et₂AlCl (control) | None | | 90 | 3.32 | |
| 183 | Et₃Al and TiCl₃·⅓ AlCl₃+¼ CCl₄ | CH₂:CHCl | 0.8 | 86 | 1.59 | |
| 184 | Et₃Al and TiCl₃·⅓ AlCl₃+¼ CCl₄ (control) | None | | 85 | 2.67 | |
| 185 | Et₃Al and TiCl₃·⅓ AlCl₃+½ PCl₃ | CH₂:CHCl | 0.8 | 88 | 1.56 | |
| 186 | Et₃Al and TiCl₃·⅓ AlCl₃+½ PCl₃ (control) | None | | 96 | 4.67 | |
| 187 | Et₃Al and TiCl₃·⅓ AlCl₃+½PhCOCl | CH₂:CHCl | 0.8 | 81 | 2.65 | |
| 188 | Et₃Al and TiCl₃·⅓ AlCl₃+½PhCOCl (control) | None | | 86 | 6.23 | |
| 189 | Et₃Al and TiCl₃·⅓ AlCl₃ | cis-PhCH:CClPh | 2.0 | 59 | 2.61 | |
| 190 | do | cis-PhCH:CClPh | 0.5 | 59 | 2.26 | |

*Except where Remarks state otherwise, an aluminum to titanium mole ratio of 2 was used.

The results tabulated in Table IX show that polypropylene prepared in the presence of some vinyl halides, such as vinyl chloride, vinyl fluoride, and 2-chloropropene have inherent viscosities (and therefore molecular weights) which are much lower than those of the polypropylene prepared from the same catalyst system without the vinyl halide. While this has been recognized by the prior art in the case of these particular vinyl halides, the tion bottles until from about 6 to about 6.5 grams of the gas was consumed.

The polyethylene product was washed with dilute hydrochloric acid, then with isopropanol, and then dried under nitrogen. Polymer yields were essentially quantitative. Inherent viscosities were measured in Decalin at 1 gram per liter concentration at 130° C. The data obtained in the ethylene polymerization runs are set forth in Table X.

TABLE X

| Example | Basic Catalyst System | Vinylic Halide | Halogen/Al Atomic Ratio | Inherent Viscosity | Remarks |
|---|---|---|---|---|---|
| 191 | Et₃Al and TiCl₄ | CH₂:CHCl | 1 | 5.46 | |
| 192 | do | CHCl:CCl₂→solvent | | 2.12 | |
| 193 | do | CHI₂:CCl₂→solvent | | 10.03 | |
| 194 | do | None | | 9.45 | Control. |

It can be seen from the data in Table X that polyethylene prepared in the presence of vinyl chloride, and in the presence of trichloroethylene when the latter compound is used as the ploymerization medium has a lower molecular weight (inherent viscosity) than the polyethylene prepared in the control run in which a catalyst was used containing no vinyl halide compound. While the use of vinyl chloride for lowering the molecular weight of ethylenically unsaturated polymers has heretofore been known, it is believed that we are the first to discover the effectiveness of trichloroethylene for this purpose, in addition to being first in our discoverey that it may be employed as a polymerization solvent in which the polymerization may be carried out.

The polyethylene obtained using tetrachloroethylene as the polymerization medium has a molecular weight that does not significantly differ from the control run. This verifies the disclosure of at least one patent which previously has reported that tetrachloroethylene displays no advantageous catalytic activity in polymerizing ethylenically unsaturated monomers, and that this material may be used as a polymerization medium.

Although certain specific examples and embodiments of this invention have been hereinbefore described, the invention is not to be considered as limited to the precise reaction conditions and reactants cited since changes and modifications may be made therein which are within the spirit and scope of the invention as defined by the appended claims.

What is claimed is:
1. A process for producing highly isotactic polymers consisting essentially of:
(a) contacting an ethylenically unsaturated hydrocarbon monomer containing at least three carbon atoms under polymerization conditions with the following compounds added sequentially in the order listed:
(1) an isotaxy-improxing quantity of a compound represented by the structural formula

where X is a halogen atom, R₁ is selected from the group consisting of hydrocarbon radicals, hydrogen or halogen, and R₂ is selected from the group consisting of hydrocarbon radicals and halogen, and provided that when R₁ is a halogen atom, R₂ may be a hydrogen atom, that when C is a secondary carbon atom, R₁ and R₂ include a halide substituted hydrocarbon radical, and that when C is substituted with three fluorine atoms, the remaining substituent is selected from the group consisting of chlorine, bromine and iodine atoms; and (2) an organo-aluminum compound having the formula AlRₙX₃₋ₙ where R is a hydrocarbon radical, X is selected from hydrogen and hologen selected from the group consisting of chlorine, bromine, and iodine, and n varies from 2 to 3; and (3) a titanium metal halide wherein the halogen is selected from the group consisting of chlorine, bromine, and iodine.

(b) recovering a polymer having a higher isotactic index than that which is obtained in the absence of compound in (1).

2. A process as claimed in claim 1 wherein the compound represented by the structure

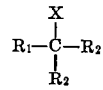

is carbon tetrachloride.

3. A process as claimed in claim 1 wherein the compound represented by the structural formula

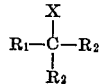

is chloroform.

References Cited

UNITED STATES PATENTS

| | | | |
|---|---|---|---|
| 3,317,502 | 5/1967 | Harban et al. | 260—93.7 |
| 3,288,773 | 11/1966 | Harban et al. | 260—93.7 |
| 3,101,327 | 8/1963 | Lyons. | |
| 3,101,328 | 8/1963 | Edmonds. | |

FOREIGN PATENTS

| | | |
|---|---|---|
| 1,371,089 | 10/1963 | France. |
| 887,974 | 1/1962 | Great Britain. |
| 790,399 | 2/1958 | Great Britain. |
| 814,837 | 6/1959 | Great Britain. |
| 626,642 | 7/1963 | Belgium. |

JOSEPH L. SCHOFER, *Primary Examiner.*

M. B. KURTZMAN, *Assistant Examiner.*

U.S. Cl. X.R.

252—429; 260—80.78, 88.2, 93.1, 93.5, 94.3, 94.8, 94.9